(12) United States Patent
Yang et al.

(10) Patent No.: US 10,212,621 B2
(45) Date of Patent: Feb. 19, 2019

(54) APPARATUS AND METHOD FOR CONFIGURING DNS OF MOBILE DEVICE, AND STORAGE MEDIUM

(71) Applicant: HISENSE MOBILE COMMUNICATIONS TECHNOLOGY CO., LTD., Qingdao (CN)

(72) Inventors: Chuanqing Yang, Qingdao (CN); Zizhi Sun, Qingdao (CN); Bin Zheng, Qingdao (CN); Shidong Shang, Qingdao (CN); Changsheng Zhou, Qingdao (CN)

(73) Assignees: Hisense Mobile Communications Technology Co., Ltd., Qingdao (CN); Hisense USA Corporation, Suwanee, GA (US); Highsense International Co., Ltd., Qingdao (CN)

( * ) Notice: Subject to any disclaimer, the term of this patent is extended or adjusted under 35 U.S.C. 154(b) by 8 days.

(21) Appl. No.: 15/053,690

(22) Filed: Feb. 25, 2016

(65) Prior Publication Data

US 2017/0094552 A1    Mar. 30, 2017

(30) Foreign Application Priority Data

Sep. 30, 2015    (CN) .......................... 2015 1 0644943

(51) Int. Cl.
*H04W 28/02* (2009.01)
*H04B 7/15* (2006.01)
(Continued)

(52) U.S. Cl.
CPC .......... *H04W 28/0236* (2013.01); *H04B 7/15* (2013.01); *H04H 20/16* (2013.01);
(Continued)

(58) Field of Classification Search
CPC ........ H04B 7/15; H04H 20/16; H04L 9/3226; H04L 29/12066; H04L 43/04;
(Continued)

(56) References Cited

U.S. PATENT DOCUMENTS

| 8,780,796 B1 * | 7/2014 | Ballal ................. H04W 76/022 370/328 |
| 2007/0211714 A1 * | 9/2007 | Metke ............... H04L 29/12066 370/389 |

(Continued)

FOREIGN PATENT DOCUMENTS

| CN | 102143509 A | 8/2011 |
| CN | 104539464 A | 4/2015 |

OTHER PUBLICATIONS

Office Action from corresponding Chinese Application No. 201510644943.2 dated Jan. 23, 2018 (4 pages).

*Primary Examiner* — Hassan Kizou
*Assistant Examiner* — Hector Reyes
(74) *Attorney, Agent, or Firm* — Harness, Dickey & Pierce, P.L.C.

(57) ABSTRACT

The disclosure provides an apparatus and method for configuring DNS of a mobile device, and a storage medium. The apparatus includes: one or more processors; and a memory, wherein: the memory stores therein one or more computer readable program codes configured to be executed by the one or more processors to perform the operations of: functioning, by the mobile device, as a Wi-Fi relay to be connected with both a wireless access point and an electronic device; determining state information of communication between the wireless access point and the electronic device, forwarded by the relaying mobile device; determining whether communication is abnormal, according to the state information; and if so, then detecting a network service provider serving the mobile device; if the network service (Continued)

provider serving the mobile device is detected, then configuring a DNS list adapted to the network service provider; and configuring a DNS service of the mobile device according to the DNS list.

14 Claims, 5 Drawing Sheets

(51) Int. Cl.
    *H04H 20/16*     (2008.01)
    *H04L 9/32*     (2006.01)
    *H04L 12/741*     (2013.01)
    *H04W 84/12*     (2009.01)
    *H04W 88/02*     (2009.01)
    *H04W 88/08*     (2009.01)
    *H04W 88/16*     (2009.01)

(52) U.S. Cl.
    CPC .......... *H04L 9/3226* (2013.01); *H04L 45/745* (2013.01); *H04L 2209/80* (2013.01); *H04W 84/12* (2013.01); *H04W 88/02* (2013.01); *H04W 88/08* (2013.01); *H04W 88/16* (2013.01)

(58) Field of Classification Search
    CPC .............. H04L 45/745; H04L 61/1511; H04W 28/0236; H04W 40/22; H04W 72/082; H04W 84/12; H04W 88/02; H04W 88/04; H04W 88/08; H04W 88/16
    See application file for complete search history.

(56) References Cited

U.S. PATENT DOCUMENTS

| | | | |
|---|---|---|---|
| 2011/0075643 A1* | 3/2011 | Natan | H04W 48/18 370/338 |
| 2014/0056209 A1 | 2/2014 | Park et al. | |
| 2015/0244876 A1 | 8/2015 | Jabara et al. | |
| 2015/0288648 A1* | 10/2015 | Seo | H04L 61/1511 709/245 |
| 2015/0350097 A1* | 12/2015 | Osuga | H04L 43/0852 370/230 |

* cited by examiner

APPARATUS AND METHOD FOR CONFIGURING DNS OF MOBILE DEVICE, AND STORAGE MEDIUM

CROSS-REFERENCE TO RELATED APPLICATION

This application claims the benefit and priority of Chinese Patent Application No. 201510644943.2 filed Sep. 30, 2015. The entire disclosure of the above application is incorporated herein by reference.

FIELD

The present disclosure relates to the field of mobile communications and particularly to an apparatus and method for configuring DNS of mobile device, and a storage medium.

BACKGROUND

This section provides background information related to the present disclosure which is not necessarily prior art.

Along with the improving level of our social life, wireless signals, e.g., Wireless Fidelity (Wi-Fi), have been widely applied to the various aspects of our life due to their convenience and expeditiousness.

However the strength and coverage area of the wireless signals in use have become significant factors affecting the experience of a user.

For example, if a router is placed in a sitting room, and a handset is placed in a bedroom, then there will be such a poor Wi-Fi signal that the network signal may be instable.

SUMMARY

This section provides a general summary of the disclosure, and is not a comprehensive disclosure of its full scope or all of its features.

An embodiment of the disclosure discloses a method for configuring DNS of a mobile device, the method including:

functioning, by the mobile device, as a Wi-Fi relay to be connected with both a wireless access point and an electronic device;

determining state information of communication between the wireless access point and the electronic device, forwarded by the relaying mobile device;

determining whether communication is abnormal, according to the state information; and if so, then detecting a network service provider serving the mobile device;

if the network service provider serving the mobile device is detected, then configuring a DNS list adapted to the network service provider; and configuring a DNS service of the mobile device according to the DNS list.

An embodiment of the disclosure further discloses an apparatus for configuring DNS of a mobile device, applicable to the mobile device, the apparatus including:

one or more processors; and a memory, wherein:

the memory stores therein one or more computer readable program codes configured to be executed by the one or more processors to perform the operations of:

functioning, by the mobile device, as a Wi-Fi relay to be connected with both a wireless access point and an electronic device;

determining state information of communication between the wireless access point and the electronic device, forwarded by the relaying mobile device;

determining whether communication is abnormal, according to the state information; and if so, then detecting a network service provider serving the mobile device;

if the network service provider serving the mobile device is detected, then configuring a DNS list adapted to the network service provider; and configuring a DNS service of the mobile device according to the DNS list.

An embodiment of the disclosure further discloses a storage medium storing computer readable program codes configured to be executed by one or more processors perform the operations of:

functioning, by the mobile device, as a Wi-Fi relay to be connected with both a wireless access point and an electronic device;

determining state information of communication between the wireless access point and the electronic device, forwarded by the relaying mobile device;

determining whether communication is abnormal, according to the state information; and if so, then detecting a network service provider serving the mobile device;

if the network service provider serving the mobile device is detected, then configuring a DNS list adapted to the network service provider; and configuring a DNS service of the mobile device according to the DNS list.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

In the embodiments of the disclosure, if abnormal relayed communication between a wireless access point and an electronic device is detected, then a serving network service provider is detected dynamically to retrieve an adapted DNS list to configure DNS so as to guarantee a normal access to a network without restarting a Wi-Fi service or reconfiguring a DNS service of Wi-Fi.

Figure 1:
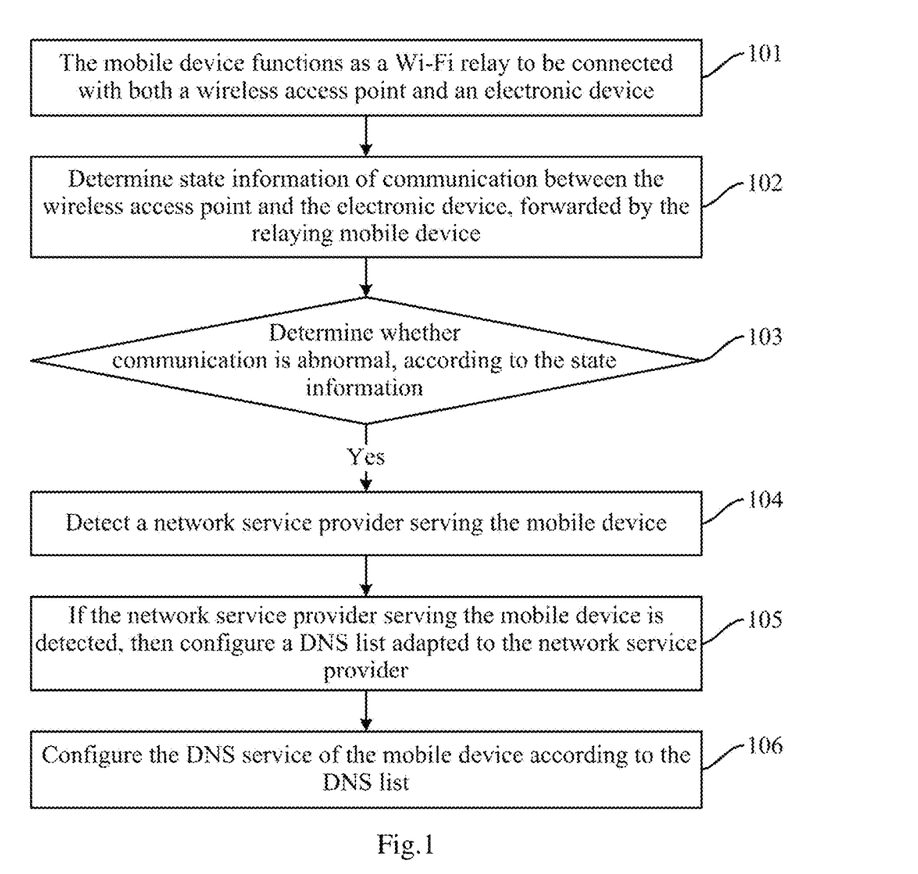
FIG. 1 is a flow chart of a method for configuring DNS of a mobile device according to an embodiment of the disclosure.

Referring to FIG. 1, there is illustrated a flow chart of a method for configuring DNS of a mobile device according to an embodiment of the disclosure, where the method can include the following operations:

Operation 101: the mobile device functions as a Wi-Fi relay to be connected with both a wireless Access Point (AP) and an electronic device.

It shall be noted that the embodiment of the disclosure can be applicable to an operating system of the mobile device, e.g., a handset, a tablet computer, a smart wearable device (e.g., a smart watch), etc.

These mobile devices generally support Windows Phone, Android, IOS, Windows, and other operating systems, and typically can be connected with a wireless access point, e.g., a router, through Wi-Fi.

Figure 2:
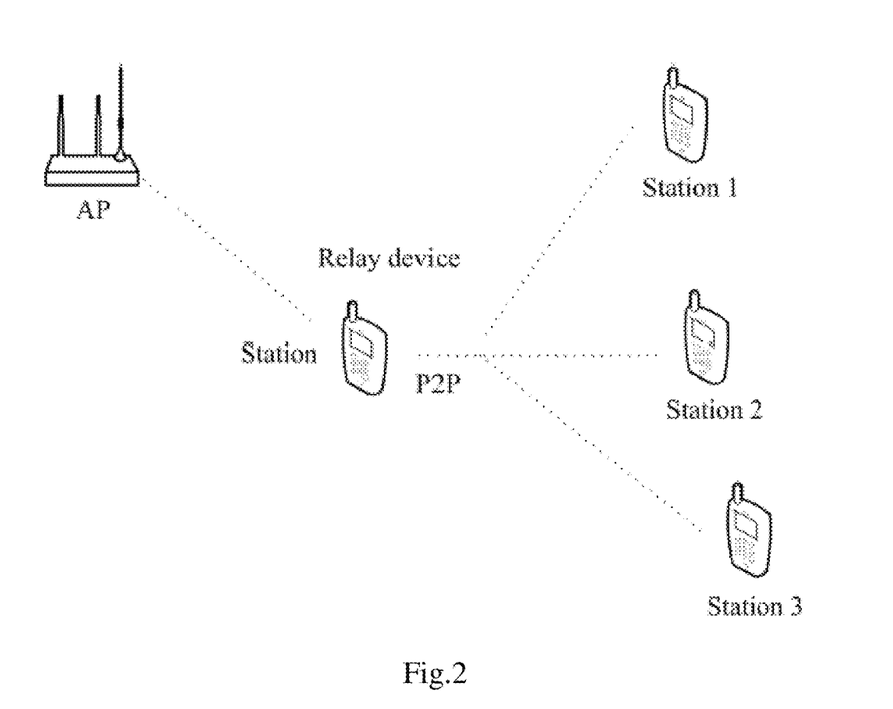
FIG. 2 is a schematic structural diagram of a topology of a relay system according to an embodiment of the disclosure.

In an embodiment of the disclosure, the operation 101 can include the following sub-operations:

Sub-operation S11: the mobile device is connected with the wireless access point through a station node of Wi-Fi;

As illustrated in FIG. 2, the AP is such a specific node in a wireless network that can access a base station, and through which another type of node in the wireless network can communicate with another device outside or inside the wireless network.

Wi-Fi of the mobile device typically configures the mobile device as a station or a softAP, or with P2P.

Particularly the station refers to such a device accessing the wireless network that can communicate with another device inside or outside the wireless network through a wireless access point.

The softAP refers to the mobile device functioning as a wireless access point so that the softAP-enabled mobile device can act as a router enabling an access of another station to the wireless network.

The P2P (Peer-to-Peer) function, also referred to as Wi-Fi Direct, can enable two Wi-Fi devices to be connected directly with and to communicate with each other without any wireless access point.

In the embodiment of the disclosure, the getWifiState( ) function in WifiManager can be invoked to detect whether the mobile device is enabled as a Wi-Fi station node.

If a station node being enabled is detected, then the API interface getNetworkInfo( ) provided by ConnectivityManager can be invoked by inputting ConnectivityManager.TYPE_WIFI as a parameter thereto to determine whether the station node is connected to an AP.

If the returned NetworkInfo object is not Null, and isConnected( ) is true, then it will be determined that the station node is connected to an AP.

If it is determined that the station node is connected to a wireless access point, then it will be determined that the mobile device is connected to the AP.

If it is determined that no station node is enabled or the station node is not connected to any AP, then an instruction will be generated that Connect to a Wireless Access Point, e.g., "Enable Wi-Fi and connect to a router".

Sub-operation S12: a relay instruction is sent to Wi-Fi module through a P2P mode of Wi-Fi so that logon information of the mobile device is broadcasted, and one or more electronic devices are connected through the P2P node;

As illustrated in FIG. 2, if Wi-Fi is connected to an active AP, then a relay instruction will be sent to the Wi-Fi module to enable Wi-Fi relaying.

A first channel over which the wireless access point, to which the station node is connected, operates can be detected;

Logon information for logging into the mobile terminal can be obtained, where the logon information includes a service set identifier and a password;

A second channel without interference with the first channel can be determined;

A first length of the service set identifier, and a second length of the password can be calculated;

The second channel, the service set identifier, the first length, the password, and the second length can be encapsulated in the relay instruction; and The relay instruction can be sent in a group mode of the P2P node of Wi-Fi so that the service set identifier is broadcasted as per the first length over the second channel.

Furthermore if the Wi-Fi station is enabled and connected with an AP, then the first channel of the AP connected with the station can be obtained, and the relay instruction over the second channel without interference with the first channel when the P2P mode is activated can be sent.

Frequencies of the different channels are as follows:

Freq=2412 (Channel 1) Freq=2417 (Channel 2) Freq=2422 (Channel 3)
Freq=2427 (Channel 4) Freq=2432 (Channel 5) Freq=2437 (Channel 6)
Freq=2442 (Channel 7) Freq=2447 (Channel 8) Freq=2452 (Channel 9)
Freq=2457 (Channel 10) Freq=2462 (Channel 11) Freq=2467 (Channel 12)
Freq=2472 (Channel 13)

Figure 3:
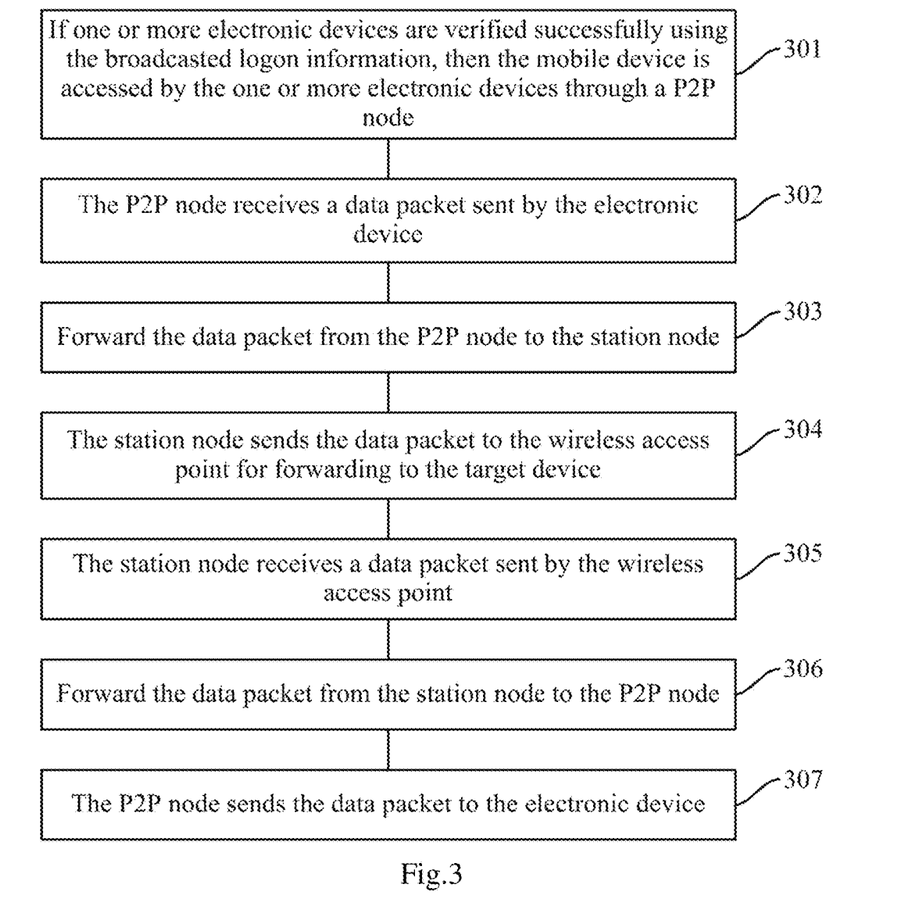
FIG. 3 is a flow chart of a method for relaying by a mobile device according to an embodiment of the disclosure.

As illustrated in FIG. 3, the spectrum of the channels 1 to 14 in the 2.4G band is a gradient matrix, and from the perspective of their bands, these channels are divided into three separate bands in total, and the channels in the respective separate bands interfere with each other, where the particular bands are as follows:

Zone 1: Channels 1 to 5
Zone 2: Channels 6 to 10
Zone 3: Channels 11 to 14

From the perspective of isolating the bands, there are five isolation intervals in total, and the channels in the isolation intervals do not interfere with each other, where the particular intervals are as follows:

Class 1: 1, 6, 11
Class 2: 2, 7, 12
Class 3: 3, 8, 13
Class 4: 4, 9
Class: 5, 10

After the second channel to be configured is determined, the user is asked on a User Interface (UI) to enter a service set identifier (SSID) and a password of the relay device (i.e., the mobile device).

If the user enters the SSID and the password on the UI, then the SSID and the password will be used; otherwise, a default SSID and a default password will be used.

The first length of the SSID, and the second length of the password are calculated for sending the relay instruction.

There are two existing P2P modes including the P2P group mode and the P2P client mode.

P2P enables a number of Wi-Fi devices to constitute a network (a P2P network, also referred to as a P2P group), and to communicate with each other, without any AP.

Before the P2P group is created, all the smart terminals are respective P2P devices.

After these P2P devices negotiate about P2P, one of the devices plays the role of a Group Owner (GO) (i.e., acts as an AP), and the other devices play the role of clients.

The original P2P group function is:

p2p_ctrl_group_add(struct wpa_supplicant *wpa_s, char *cmd)

In the above P2P group function, none of the channel, the SSID, the password, and the other parameters can be transmitted.

In the embodiment of the disclosure, the Wi-Fi protocol stack is modified by forcibly setting the P2P mode to the group mode in which an SSID and a password can be set as desirable to the user so that the mobile device which is a relay device can be scanned and identified by an electronic device using the SSID, and communication can be secured using the password.

The P2P_GROUP_ADD instruction is extended in the Wi-Fi protocol stack Wpa_supplicant of the system:

wpas_p2p_group_add_with_ssid(wpa_s, 1, freq, ht40, ssid, passphrase, ssid_len, passphrase_len)

Where freq represents the second channel, ssid_len represents the first length, passphrase represents the password, and passphrase_len represents the second length.

The channel, the SSID, the password, and the other parameters can be sent in the extended P2P group function.

After the relay instruction is sent, the relay device (i.e., the mobile device) sends a broadcast frame carrying the SSID, and the other scanning electronic device locating the relay device can connect using the SSID and the password.

Sub-operation S13: a packet forwarding function can be enabled to enable a data packet to be forwarded between the different nodes of Wi-Fi in the mobile device.

Packet forwarding refers to forwarding a packet from one device to another device.

The packet forwarding function can be enabled using the echo attribute value.

echo 1 >/proc/sys/net/ipv4/ip_forward

In the embodiment of the disclosure, the packet forwarding function can be enabled to forward a data packet between the station node and the P2P node.

Sub-operation S14: configuration information of packet forwarding is sent to the Wi-Fi module so that a data packet is forwarded between the station node and the P2P node.

In a real application, the address table service iptables of the system can be invoked to send a routing table to the Wi-Fi module, where the routing table includes a route between a first IP address of the P2P node, and a second IP address of the station node; and The address table service iptables of the system can be invoked to send configuration information of the Network Address Translation (NAT) function to the Wi-Fi module, where the source IP address and the destination IP address of the IP message are modified automatically by the NAT function to translate the first IP address of the P2P node.

Of course, a prior routing table can be further removed before the routing table and the NAT function are sent.

The configuration information of iptables and NAT is as follows:

remove old rules (The prior routing table is removed)
iptables -F
iptables -t filter -F
iptables -t nat -F
Bring up NAT rules
iptables -t nat -A POSTROUTING -s 192.168.49.0/24 -d 0.0.0.0/0 -j MASQUERADE Here if the IP segment of the relay device (i.e., the mobile device) is 192.168.49.0, then "Bring up NAT rules" can be sent to re-encapsulate and de-encapsulate the data packet with the source address being the network segment of 192.168.49.0/24 by translating the source address into 0.0.0.0/0, and to forward the data packet to the station node.

Sub-operation S15: configuration information of a Domain Name System (DNS) is sent to the Wi-Fi module so that a data packet received by the P2P node is forwarded.

The address table service iptables in the system can be invoked to send the address of a gateway of the DNS based on the Transport Control Protocol (TCP) to the Wi-Fi module in the command format of:

iptables -t nat -I PREROUTING -i (the name of the relay device) -p tcp --dport 53 -j DNAT --to-destination (the router gateway)

The address table service iptables in the system can be invoked to send the address of the gateway of the DNS based on the User Datagram Protocol (UDP) of open system interconnection protocol to the Wi-Fi module.

Sub-operation S16: if one or more electronic devices are verified successfully using the broadcasted logon information, then the mobile device is accessed by the one or more electronic devices through the P2P node.

The relay device (i.e., the mobile device) can be regarded as an AP to broadcast a beacon frame periodically so that another scanning station device locating the beacon frame can be provided with the SSID of the relay device (i.e., the mobile device).

If a request sent by the one or more electronic devices for the service set identifier in the logon information is received, then a response message of Challenge Text is returned to the one or more electronic devices;

If a connection request sent by the one or more electronic devices is received, then a password in the connection request is verified for consistency with the password in the logon information according to the second length of the password in the logon information; and If the passwords are consistent, then the one or more electronic devices access the mobile terminal, e.g., electronic devices of Station 1, Station 2, and Station 3 as illustrated in FIG. 2.

Operation 102: state information of communication between the wireless access point and the electronic device, forwarded by the relaying mobile device is determined;

In the embodiment of the disclosure, the current usage condition of the Wi-Fi network can be determined, and the state information of the relay network can be detected, where the state information can include a network access delay and/or a communication throughput;

Here the network access delay is a period of time required for transmission from one end of the network (e.g., the mobile device) to the other end thereof (e.g., a webpage server).

In order to test the network access delay, a ping command in the DOS can be invoked to send a test data packet to an IP network address so as to determine whether the destination IP address responds and to estimate a response period of time to thereby test the network.

If the response period of time is shorter, then the network access delay will be less; and if the response period of time is longer, then the network access delay will be more.

The communication throughput is the amount of data forwarded by the relaying mobile device, where all the data packets transmitted over the network through Wi-Fi are counted in real time.

Of course, the state information above is merely an example, and in an implementation of the embodiment of the disclosure, other state information can be set as required in reality, and the embodiment of the disclosure will not be limited to any particular state information. Moreover those skilled in the art can apply other state information than the state information above as required in reality, and the embodiment of the disclosure will not be limited to any particular state information.

Operation 103: it is determined whether communication is abnormal, according to the state information; and if so, then the flow proceeds to the operation 104;

Since the mobile device is highly portable, it can be configured easily as a relay in different network environments to provide another electronic device with a relay service. However the network environment may be so changing that a DNS list may not be adapted, thus resulting in abnormal communication where an access to the network may become slow or even impossible.

Alternatively if the network fails (for example, a routing node is disconnected), then communication may also become abnormal, where typically an access to the network may become slow or even impossible.

In the embodiment of the disclosure, it can be determined whether communication is abnormal, according to the detected state information of the network.

If the network access delay is above a preset delay threshold (e.g., 500 ms) and/or the communication throughput is below a preset network speed threshold (e.g., 10 kbit/s), then abnormal communication can be determined.

Of course, the scheme to detect abnormal communication is only an example, and in an implementation of the embodiment of the disclosure, another scheme to detect abnormal communication can be devised as required in reality, and the embodiment of the disclosure will not be limited to any particular scheme to detect abnormal communication.

Operation 104: a network service provider serving the mobile device is detected;

In the embodiment of the disclosure, if abnormal communication is detected, then a DNS service can be configured dynamically.

Since deployed different backbone network infrastructures of respective operators are isolated from each other instead of being interconnected, if the DNS service is configured dynamically, then the currently serving network service provider shall be known, e.g., China Unicom, China Telecom, China Mobile, etc.

An IP address of the mobile device can be obtained, and a server of the network or a local database can be inquired about the network service provider serving the IP address.

Operation 105: if the network service provider serving the mobile device is detected, then a DNS list adapted to the network service provider will be configured;

If the network service provider currently serving the mobile device is China Mobile, then the DNS list will be configured as universal DNS of China Mobile, e.g., 218.201.96.130;

If the network service provider currently serving the mobile device is China Unicom, then the DNS list will be configured as universal DNS of China Unicom, e.g., 202.102.164.189; and If the network service provider currently serving the mobile device is China Telecom, then the DNS list will be configured as DNS of China Telecom, e.g., 222.173.107.2.

It shall be noted that since the AP is directed to a gateway which is also an IP address, e.g., the IP address of a router, then from the perspective of a network topology, the router per se typically is configured with an available DNS service, so the router can be regarded as a trusted network node.

Thus if the detection fails, then the DNS list can be configured as the gateway to which the wireless access point is directed.

Operation 106: the DNS service of the mobile device is configured according to the DNS list.

The DNS service can be configured using the address table service iptables:

iptables -t nat -I PREROUTING -i ap0 -p tcp --dport 53 -j DNAT --to-destination [DNS SERVER]
iptables -t nat -I PREROUTING -i ap0 -p udp --dport 53 -j DNAT --to-destination [DNS SERVER]

In the embodiment of the disclosure, if abnormal relayed communication between the wireless access point and the electronic device is detected, then the serving network service provider will be detected dynamically to retrieve the adapted DNS list to configure DNS so as to guarantee a normal access to the network without restarting the Wi-Fi service or reconfiguring the DNS service of Wi-Fi.

Referring to FIG. 3, there is illustrated a flow chart of a method for relaying by a mobile device according to an embodiment of the disclosure, where the method can include the following operations:

Operation 301: if one or more electronic devices are verified successfully using the broadcasted logon information, then the mobile device is accessed by the one or more electronic devices through a P2P node;

The relay device (i.e., the mobile device) can be regarded as an AP to broadcast a beacon frame periodically so that another scanning station device locating the beacon frame can be provided with an SSID of the relay device (i.e., the mobile device).

If a request sent by the one or more electronic devices for a service set identifier in the logon information is received, then a response message of Challenge Text is returned to the one or more electronic devices;

If a connection request sent by the one or more electronic devices is received, then a password in the connection request is verified for consistency with a password in the logon information according to a second length of the password in the logon information; and If the passwords are consistent, then the one or more electronic devices access the mobile terminal, e.g., electronic devices of Station 1, Station 2, and Station 3 as illustrated in FIG. 2.

Operation 302: the P2P node receives a data packet sent by the electronic device;

If the connected electronic device communicates with an external target device, then the electronic device will send the data packet to the relay device (i.e. the mobile device).

Operation 303: the data packet is forwarded from the P2P node to the station node;

It is determined whether a source address of the data packet is a first IP address of the P2P node, e.g., 192.168.49.0, and if so, then the first IP address is translated into a destination IP address of 0.0.0.0 based upon configuration information of NAT; and A routing table is searched for a second IP address corresponding to the first IP address, and since a packet forwarding function is enabled in advance, a data packet from the translated destination IP address can be forwarded to a station node at the second IP address.

Operation 304: the station node sends the data packet to the wireless access point for forwarding to the target device;

In a real application, the data packet includes Uniform Resource Locator (URL) information, and the wireless access point maps the URL information to an IP address through a Domain Name System (DNS), and forwards the data packet to the target device at the IP address, e.g., a web server, through the base station illustrated in FIG. 2.

It shall be noted that the station node operates over a first channel, and the P2P node operates over a second channel, thus avoiding interference to each other.

Operation 305: the station node receives a data packet sent by the wireless access point.

If the external target device communicates with the electronic device connected therewith, then the target device will send the data packet to the relay device (i.e., the mobile device) through the base station.

Operation 306: the data packet is forwarded from the station node to the P2P node;

If a second IP address of the station node from which the data packet originates is determined, and the routing table is searched for a first IP address corresponding to the second IP address, then the data packet can be forwarded to the P2P node at the first IP address.

Operation 307: the P2P node sends the data packet to the electronic device.

The relay device sends the data packet of the external target device to the electronic device through the P2P node to thereby relay the data packet.

It shall be noted that the station node operates over the first channel, and the P2P node operates over the second channel, thus avoiding interference to each other.

It shall be noted that for the sake of a concise description, the embodiments of the method have been described as a series of actions in combination, but those skilled in the art shall appreciate that the embodiment of the disclosure will not be limited to the described order of the actions because some of the steps may be performed in another order or concurrently dependent upon the embodiments of the disclosure. Secondly those skilled in the art shall also appreciate that all the embodiments described here are preferred embodiments, but all the actions involved in the embodiments may not necessarily be necessary to the embodiments of the disclosure.

An embodiment of the disclosure further provides an apparatus for configuring DNS of a mobile device, applicable to the mobile device, where the apparatus can include:

One or more processors; and

Figure 4:
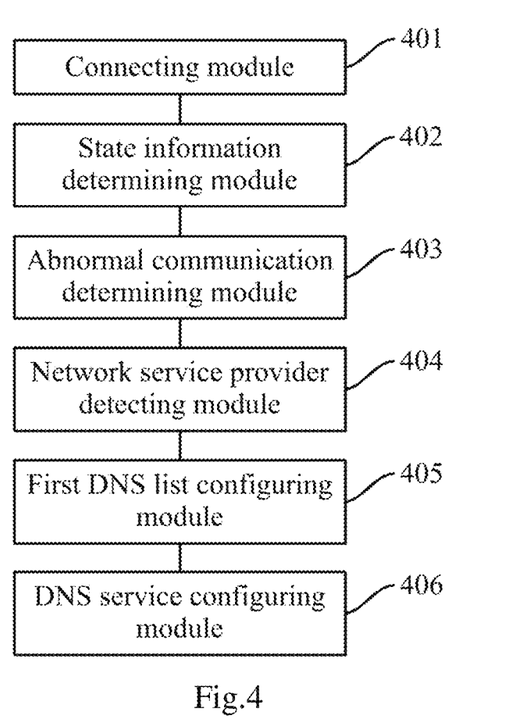
FIG. 4 is a schematic structural diagram of an apparatus for configuring DNS of a mobile device according to an embodiment of the disclosure.
Figure 5:
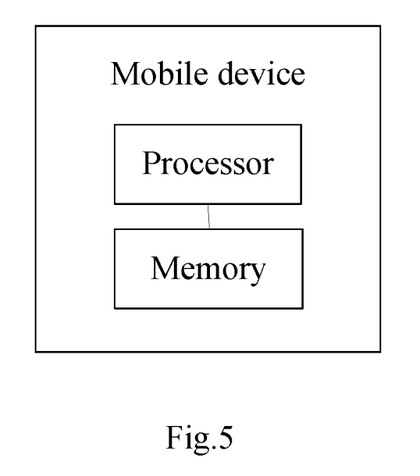
FIG. 5 is a schematic structural diagram of a mobile device according to an embodiment of the disclosure.

A memory, where:

The memory stores therein one or more computer readable program codes configured to be executed by the one or more processors to function as the following modules illustrated in FIG. 4:

A connecting module 401 is configured to function as a Wi-Fi relay to be connected with both a wireless access point and an electronic device;

A state information determining module 402 is configured to determine state information of communication between the wireless access point and the electronic device, forwarded by the relaying mobile device;

An abnormal communication determining module 403 is configured to determine whether communication is abnormal, according to the state information; and if so, to invoke a network service provider detecting module;

The network service provider detecting module 404 is configured to detect a network service provider serving the mobile device;

A first DNS list configuring module 405 is configured, if the network service provider serving the mobile device is detected, to configure a DNS list adapted to the network service provider; and A DNS service configuring module 406 is configured to configure a DNS service of the mobile device according to the DNS list.

In an embodiment of the disclosure, the state information includes a network access delay and/or a communication throughput; and The abnormal communication determining module 403 can include the following sub-modules:

An abnormal communication determining sub-module is configured to determine abnormal communication if the network access delay is above a preset delay threshold and/or the communication throughput is below a preset network speed threshold.

In an embodiment of the disclosure, the network service provider detecting module 404 can include the following sub-modules:

An IP address obtaining sub-module is configured to obtain an IP address of the mobile device; and An inquiring sub-module is configured to inquire about the network service provider serving the IP address.

In an embodiment of the disclosure, the apparatus can further include the following module:

A second DNS list configuring module is configured to configure the DNS list as a gateway to which the wireless access point is directed, if no network service provider serving the mobile device is detected.

In an embodiment of the disclosure, the connecting module 401 can include the following sub-modules:

A wireless access point connecting sub-module is configured to connect the mobile device with the wireless access point through a station node of Wi-Fi;

A relay instruction sending sub-module is configured to send a relay instruction to a Wi-Fi module through a P2P node of Wi-Fi so that logon information of the mobile device is broadcasted, and one or more electronic devices are connected through the P2P node;

A packet forward enabling sub-module is configured to enable a packet forwarding function to enable a data packet to be forwarded between the different nodes of Wi-Fi in the mobile device;

A packet forward configuring sub-module is configured to send configuration information of packet forwarding to the Wi-Fi module so that a data packet is forwarded between the station node and the P2P node;

A DNS configuring sub-module is configured to send configuration information of a Domain Name System (DNS) to the Wi-Fi module so that a data packet received by the P2P node is forwarded; and A device accessing sub-module is configured, if one or more electronic devices are verified successfully using the broadcasted logon information, to have the one or more electronic devices access through the P2P node.

An embodiment of the disclosure further discloses a storage medium storing computer readable program codes configured to be executed by one or more processors:

For the mobile device to function as a Wi-Fi relay to be connected with both a wireless access point and an electronic device;

To determine state information of communication between the wireless access point and the electronic device, forwarded by the relaying mobile device;

To determine whether communication is abnormal, according to the state information; and if so, to detect a network service provider serving the mobile device;

If the network service provider serving the mobile device is detected, to configure a DNS list adapted to the network service provider; and To configure a DNS service of the mobile device according to the DNS list.

In an embodiment of the disclosure, the state information includes a network access delay and/or a communication throughput; and the computer readable program codes configured to be executed by the one or more processors to determine whether communication is abnormal, according to the state information are configured:

If the network access delay is above a preset delay threshold and/or the communication throughput is below a preset network speed threshold, to determine abnormal communication.

Since the embodiments of the apparatus and the storage medium are substantially similar to the embodiments of the method, the embodiments of the apparatus have been described in brief, and reference can be made to the description of the embodiments of the method for details of the embodiments of the apparatus and the storage medium.

The respective embodiments of method in the description have been described progressively, and each of the embodiments has been focused on its differences from the other embodiments, and the description of their commonalties can be applied to each other.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Lastly it shall be further noted that such relationship terms in this context as first and second, etc., are merely intended to distinguish one entity or operation from another entity or operation but not necessarily intended to require or suggest any such a real relationship or order between these entities or operations. Furthermore the terms "include", "comprise" and any variants thereof are intended to encompass nonexclusive inclusion so that a process, a method, an article or a device including a series of elements includes both those elements and one or more other elements which are not listed explicitly or one or more elements inherent to the process, the method, the article or the device. Unless stated otherwise, an element being defined in the sentence "include/comprise a(n) . . . " will not exclude the presence of one or more additional identical element in the process, the method, the article or the device including the element.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A mobile device comprising:
one or more processors; and
a memory configured to store one or more computer readable program codes configured to be executed by the one or more processors to:
detect a communication state between a wireless access point and one or more electronic devices, wherein the mobile device is configured to relay Wi-Fi from the wireless access point to the one or more electronic devices, send a relay instruction including logon information of the mobile device to the one or more electronic devices in a group mode of a P2P node of Wi-Fi, enable a packet forwarding function to allow a data packet to be forwarded between a station node of Wi-Fi and the P2P node and allow the data packet received by the P2P node to be forwarded to the one or more electronic devices, and receive, through the P2P node, verified data which is sent from the one or more electronic devices and based on the logon information of the mobile devices, wherein the mobile device is connected with the one or more electronic devices and with the wireless access point through the station node of Wi-Fi, and wherein the wireless access point and the one or more electronic devices are connected through the mobile device;
upon detecting the communication state does not meet a predefined condition, determine a network service provider serving the mobile device;
configure a list of domain name system (DNS) servers adapted to the network service provider; and
configure a DNS service of the mobile device according to the list of DNS servers.

2. The mobile device according to claim 1, wherein the predefined condition comprises a network access delay being below a preset delay threshold and/or a communication throughput being above a preset network speed threshold.

3. The mobile device according to claim 2, wherein the one or more computer readable program codes are further configured to be executed by the one or more processors to:
when no network service provider is serving the mobile device, configure the list of DNS servers to comprise an IP address of a gateway to which the wireless access point is directed.

4. The mobile device according to claim 1, wherein the one or more computer readable program codes are configured to be executed by the one or more processors to:
obtain an IP address of the mobile device; and
determine the network service provider serving the IP address.

5. The mobile device according to claim 4, wherein the one or more computer readable program codes are further configured to be executed by the one or more processors to:
when no network service provider is serving the mobile device, configure the list of DNS servers to comprise an IP address of a gateway to which the wireless access point is directed.

6. The mobile device according to claim 1, wherein the one or more computer readable program codes are further configured to be executed by the one or more processors to:
when no network service provider is serving the mobile device, configure the list of DNS servers to comprise an IP address of a gateway to which the wireless access point is directed.

7. A non-transitory storage medium configured to store computer readable program codes configured to be executed by one or more processors to perform the operations of:
detecting a communication state between a wireless access point and one or more electronic devices, wherein a mobile device is configured to relay Wi-Fi from the wireless access point to the one or more electronic devices, send a relay instruction including logon information of the mobile device to the one or more electronic devices in a group mode of a P2P node of Wi-Fi, enable a packet forwarding function to allow a data packet to be forwarded between a station node of Wi-Fi and the P2P node and allow the data packet received by the P2P node to be forwarded to the one or more electronic devices, and receive, through the P2P node, verified data which is sent from the one or more electronic devices and based on the logon information of the mobile devices, wherein the mobile device is connected with the wireless access point through the station node of Wi-Fi and wherein the wireless access point and the one or more electronic devices are connected through the mobile device;
upon detecting the communication state does not meet a predefined condition, determining a network service provider serving the mobile device;
configuring a list of DNS servers adapted to the network service provider; and
configuring a DNS service of the mobile device according to the list of DNS servers.

8. The non-transitory storage medium according to claim 7, wherein the predefined condition comprises a network access delay being below a preset delay threshold and/or a communication throughput being above a preset network speed threshold.

9. A method for configuring a DNS of a mobile device, the method comprising:
detecting a communication state between a wireless access point and one or more electronic devices, wherein the mobile device is configured to relay Wi-Fi from the wireless access point to the one or more electronic devices, send a relay instruction including logon information of the mobile device to the one or more electronic devices in a group mode of a P2P node of Wi-Fi, enable a packet forwarding function to allow a data packet to be forwarded between a station node of Wi-Fi and the P2P node and allow the data packet received by the P2P node to be forwarded to the one or more electronic devices, and receive, through the P2P node, verified data which is sent from the one or more electronic devices and based on the logon information of the mobile devices, wherein the mobile device is connected with the wireless access point through the station node of Wi-Fi and wherein the wireless access point and the one or more electronic devices are connected through the mobile device;
upon detecting the communication state does not meet a predefined condition, determining a network service provider serving the mobile device;
configuring a list of DNS servers adapted to the network service provider; and
configuring a DNS service of the mobile device according to the list of DNS servers.

10. The method according to claim 9, wherein the predefined condition comprises a network access delay being below a preset delay threshold and/or a communication throughput being above a preset network speed threshold.

11. The method according to claim 10, further comprising:
when no network service provider is serving the mobile device, configuring the list of DNS servers to comprise an IP address of a gateway to which the wireless access point is directed.

12. The method according to claim 9, wherein determining the network service provider serving the mobile device comprises:
obtaining an IP address of the mobile device; and
determining the network service provider serving the IP address.

13. The method according to claim 12, further comprising:
when no network service provider is serving the mobile device, configuring the list of DNS servers to comprise an IP address of a gateway to which the wireless access point is directed.

14. The method according to claim 9, further comprising:
where when no network service provider is serving the mobile device, configuring the list of DNS servers to comprise an IP address of a gateway to which the wireless access point is directed.

* * * * *